… (3,402,146)

United States Patent Office 3,402,146
Patented Sept. 17, 1968

3,402,146
PRODUCTION OF HIGH MOLECULAR POLYOXY-METHYLENES USING A TRIVALENT PHOSPHORUS CATALYST
Hermann Richtzenhain and Wilhelm Vogt, Cologne-Sulz, Germany, assignors to Dynamit Nobel Aktiengesellschaft, Troisdorf, Bezirk Cologne, Germany, a corporation of Germany
No Drawing. Filed May 10, 1962, Ser. No. 193,880
Claims priority, application Germany, May 12, 1961,
D 36,067
22 Claims. (Cl. 260—67)

This invention relates to new and useful improvements in the catalytic polymerization of formaldehyde to high molecular polyoxymethylenes.

The production of polyoxymethylenes by polymerization of anhydrous formaldehyde with a suitable polymerization catalyst in the presence of an inert solvent is known. As polymerization catalyst, there are conventionally used aliphatic and aromatic amines, hydrazines, phosphines, stibines, and arsines. It is also known to effect the polymerization at low temperatures in the presence of a solvent using acid catalysts or carbonyls of Group VIII metals or organometallic compounds. Quaternary ammonium and phosphonium compounds as well as tertiary sulfonium compounds have also already been proposed as catalysts for this purpose.

One object of this invention is the polymerization of formaldehyde using an improved catalyst.

Another object of this invention is the polymerization of formaldehyde using an improved catalyst which allows the production of polyoxymethylenes of higher molecular weight and in a greater yield.

These and still further objects will become apparent from the following description.

In accordance with the invention it has now been found that phosphorous compounds containing at least one amide or imide group directly bound to the phosphorous atom are excellent catalysts for the polymerization of formaldehyde, allowing the production of polyoxymethylenes with a high molecular weight and in greater yield than are, for example, obtained with the corresponding known aliphatic and aromatic amine catalysts.

As polymerization catalysts, there may be used in accordance with the invention certain amidites, imidites, imides and phosphazoamines having structural formulas as set forth below:

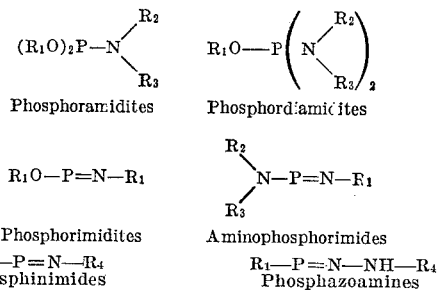

Phosphoramidites    Phosphordiamidites $R_1O-P=N-R_1$      $R_3\underset{R_3}{\overset{R_2}{\diagdown}}N-P=N-R_1$ Phosphorimidites    Aminophosphorimides $R_1-P=N-R_4$       $R_1-P=N-NH-R_4$
Phosphinimides      Phosphazoamines in which $R_1$, $R_2$, $R_3$ and $R_4$ represent aliphatic, cycloaliphatic, or aromatic hydrocarbon radicals and one or both of $R_2$ and $R_3$ may be hydrogen atoms. Furthermore, the radicals $R_2$ and $R_3$ may be joined with a nitrogen atom into a heterocyclic ring as, for example, a piperidine, or tetrahydroquinoline ring.

The trivalent phosphorus compounds which are exemplary of the classes listed above and may be used as polymerization catalysts include:

N,N-diisobutyl;
Diphenyl phosphoramidite;
Bis(N,N-diisobutyl), ethyl phosphordiamidite;
Bis(N,N-di-n-propyl), ethyl phosphordiamidite;
Bis(piperidyl), ethyl phosphordiamidite;
Bis(N,N-diisobutyl), phenyl phosphordiamidite;
N-phenyl, ethyl phosphorimidite;
N-phenyl, phenyl phosphorimidite;
N-phenyl, benzyl phosphorimidite;
N-phenyl, piperidyl phosphinimide;
N-tolyl, N-(phenyl phosphazo)amine; and
N-phenyl, N-(phenyl phosphazo)amine.

These amides and imides of phosphorous acids constitute known materials which may be prepared in a simple manner by the reaction of appropriate phosphorous acid chlorides with corresponding amines.

The formaldehyde used for the polymerization should be in monomeric form and should be substantially anhydrous. Any of the known or conventional substantially anhydrous monomer formaldehyde of random origin may be used.

The polymerization reaction may be carried out in a suitable substantially anhydrous organic solvent which is chemically inert to formaldehyde, and to the catalyst, and which remains liquid under the conditions used in the polymerization. Usefully employable organic media are the ethers; hydrocarbons such as, propane, butane, pentane, hexane, heptane, decane, cyclohexane, decahydronaphthalene, xylene, benzene and toluene; and chlorinated hydrocarbons, such as, methylene chloride. The preferred compounds are the hydrocarbons, particularly those with 3 to 10 carbon atoms in the molecule. The polymerization may, however, also be carried out in the gas phase. The polymerization may be carried out with the catalyst used in the form of solutions in the solvent, the monomer formaldehyde being passed into a solution of the catalyst in the inert organic solvent at the reaction temperature. When the polymerization of the formaldehyde is carried out in the gas phase, the possibility of a continuous process is presented. In this case the catalyst is continuously introduced into the reaction chamber containing the formaldehyde. The catalyst may be introduced into the reaction chamber either in gaseous form diluted with an inert gas or by spraying a solution of the catalyst in an inert organic solvent.

The formaldehyde is contacted with the catalyst dissolved in an inert organic solvent at a temperature within the broad range of between about −70 and +100° C. and preferably between about 0 and 50° C. The gas phase polymerization is performed at a temperature within the range of between 0°–140° C. and preferably between about 30–100° C. The catalyst may be used in amounts which vary within very broad limits. Most advantageously, the catalyst is used in the form of solutions containing, for example, between 0.000001 and 1 weight percent and preferably between 0.0001 and 0.01 weight percent based on the solvent. When conducting the gas phase polymerization the weight percentage of the catalyst is based on the weight of the introduced monomeric formaldehyde.

The polyoxymethylene polymers obtained in accordance with the invention demonstrate in the form of their 0.5% solution in p-chlorophenol containing 2% α-pinene, at 60° C., reduced viscosities. The polymeric products obtained in accordance with the invention preferably demonstrate reduced viscosities of between 1 and 7.

The polyoxymethylenes produced in accordance with the invention may be used in the same manner as the conventional polyoxymethylenes and thus after suitable stabilization may be used as the thermal plastic material in the production of plastics.

The following examples are given by way of illustration and not limitation, it being understood that wide deviations are possible in ingredients, proportions, reaction conditions, etc., without departing from the spirit of the invention.

Example 1

100 g. purified monomeric formaldehyde is introduced at 25° C. into a reaction vessel containing 186.9 mg. of dimer N-phenyl-piperidyl phosphinimide in 2000 ml. hexane. After 105 minutes the polymerization is interrupted, the separated polymer recovered by filtration, and washed and dried. There is obtained a polyoxymethylene having a reduced viscosity of 0.73.

Example 2

203 mg. dimer N-phenyl, anilido-phosphinimide (dissolved in 100 ml. toluene) are dissolved in 1800 ml. hexane. Through this solution there is conducted at a velocity of 0.82 g. per minute monomeric formaldehyde at 25° C. After 165 minutes the precipitated polymer is filtered off, washed and dried. There is obtained a polyoxymethylene having a reduced viscosity of 1.36.

Example 3

187.9 mg. N-phenyl, N-(phenylphosphazo)amine are dissolved in 800 ml. methylene-chloride and this solution is fed into a reaction vessel containing 1900 ml. hexane. 64 g. monomeric formaldehyde is passed through this solution for an 85 minute period at 25° C. There is obtained a polyoxymethylene having a reduced viscosity of 0.53.

Example 4

Into 200 ml. hexane, which contains 200 mg. bis(piperidyl)ethyl, phosphor amidite, there is introduced 114 g. monomeric formaldehyde at a velocity of 0.95 g. formaldehyde per minute at room temperature. After 120 minutes the precipitated polyoxymethylene is filtered off, washed, and dried. There is obtained a 49% yield of polyoxymethylene having a reduced viscosity of 2.16.

We claim:
1. Process for the production of high molecular weight polyoxymethylenes consisting of polymerizing substantially anhydrous monomer formaldehyde in the presence of a member selected from a group of trivalent phosphorus compounds having the following formula:

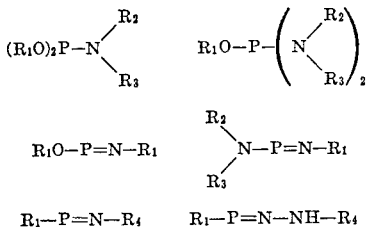

wherein $R_1$ represents a member selected from the group consisting of aliphatic, cycloaliphatic, and aromatic hydrocarbon radicals having up to 9 carbon atoms, $R_2$ and $R_3$ are each members selected from the group consisting of hydrogen, aliphatic, cycloaliphatic, and aromatic hydrocarbon radicals having up to 9 carbon atoms wherein $R_2$ and $R_3$ can be joined together with a nitrogen atom to which they are attached to form a cyclic ring selected from the group consisting of piperidine and tetrahydroquinoline rings and $R_4$ represents a member selected from the group consisting of aliphatic, cycloaliphatic, and aromatic hydrocarbon radicals having up to 9 carbon atoms as polymerization catalyst, and recovering the high molecular polyoxymethylenes produced.

2. Process as claimed in claim 1, carried out in the gas phase at a temperature of 30–100° C. in the presence of inert gas as diluent for the catalyst, and recovering the high molecular weight polyoxymethylenes produced.

3. Process for the production of high molecular weight polyoxymethylenes consisting of polymerizing substantially anhydrous monomer formaldehyde in the presence of a member selected from a group of trivalent phosphorus compounds having the following formulae:

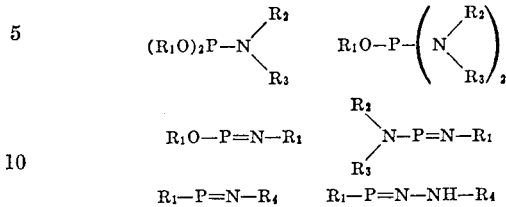

wherein $R_1$ represents a member selected from the group consisting of aliphatic, cycloaliphatic and aromatic hydrocarbon radicals having up to 9 carbon atoms, $R_2$ and $R_3$ are each members selected from the group consisting of hydrogen, aliphatic, cycloaliphatic and aromatic hydrocarbon radicals having up to 9 carbon atoms wherein $R_2$ and $R_3$ can be joined together with the nitrogen atom to which they are attached to form a cyclic ring selected from the group consisting of piperidine and tetrahydroquinoline rings and $R_4$ represents a member selected from the group consisting of aliphatic, cycloaliphatic, and aromatic hydrocarbon radicals having up to 9 carbon atoms as polymerization catalyst, at a temperture of between about −70° C. and 140° C. in the presence of an inert organic solvent, and recovering the high molecular polyoxymethylenes produced.

4. In the process for the production of high molecular weight polyoxymethylene by the catalytic polymerization of formaldehyde, the improvement of effecting the polymerization in the presence of N-phenyl, piperidyl phosphinimide as catalyst.

5. In the process for the production of high molecular weight polyoxymethylene by the catalytic polymerization of formaldehyde, the improvement of effecting the polymerization in the presence of N-phenyl anilide-phosphinimide as catalyst.

6. In the process for the production of high molecular weight polyoxymethylene by the catalytic polymerization of formaldehyde, the improvement of effecting the polymerization in the presence of N-phenyl, N-(phenyl phosphazo)amine as catalyst.

7. In the process for the production of high molecular weight polyoxymethylene by the catalytic polymerization of formaldehyde, the improvement of effecting the polymerization in the presence of bis(piperidyl), ethyl-phosphordiamidite as catalyst.

8. Process as claimed in claim 1 wherein said polymerization is carried out in the presence of an inert hydrocarbon solvent having from about 3–10 carbon atoms.

9. Process claimed in claim 8 wherein said catalyst is present in an amount of 0.00001 to 1% by weight, based on the solvent.

10. Process claimed in claim 8 wherein said catalyst is present in an amount of about 0.0001 to 0.01% by weight, based on the solvent.

11. Process claimed in claim 1 wherein said trivalent phosphorus compound is at least one member selected from the group consisting of:

N,N-diisobutyl, diphenyl phosphoramidite;
Bis(N,N-diisobutyl), ethyl phosphordiamidite;
Bis(N,N-di-n-propyl), ethyl phosphordiamidite;
Bis(piperidyl), ethyl phosphordiamidite;
Bis(N,N-diisobutyl), phenyl phosphordiamidite;
N-phenyl, ethyl phosphorimidite;
N-phenyl, phenyl phosphorimidite;
N-phenyl, benzyl phosphorimidite;
N-phenyl piperidyl phosphinimide;
N-tolyl, N-(phenyl phosphazo)amine; and
N-phenyl, N-(phenyl phosphazo)amine.

12. Process as claimed in claim 1, wherein said catalyst is N,N-diisobutyl, diphenyl phosphoramidite.

13. Process as claimed in claim 1, wherein said catalyst is bis(N,N-diisobutyl), ethyl phosphordiamidite.

14. Process as claimed in claim 1, wherein said catalyst is bis(N,N-di-n-propyl), ethyl phosphordiamidite.

15. Process as claimed in claim 1, wherein said catalyst is bis(piperidyl), ethyl phosphordiamidite.

16. Process as claimed in claim 1, wherein said catalyst is bis(N,N-diisobutyl), phenyl phosphordiamidite.

17. Process as claimed in claim 1, wherein said catalyst is N-phenyl, ethyl phosphorimidite.

18. Process as claimed in claim 1, wherein said catalyst is N-phenyl, phenyl phosphorimidite.

19. Process as claimed in claim 1, wherein said catalyst is N-phenyl, benzyl phosphorimidite.

20. Process as claimed in claim 1, wherein said catalyst is N-phenyl, piperidyl phosphinimide.

21. Process as claimed in claim 1, wherein said catalyst is N-tolyl, N-(phenyl phosphazo)amine.

22. Process as claimed in claim 1, wherein said catalyst is N-phenyl, N-(phenyl phosphazo)amine.

References Cited

UNITED STATES PATENTS

| | | | |
|---|---|---|---|
| 1,940,383 | 12/1933 | Woodstock | 260—551 |
| 2,828,286 | 3/1958 | Mac Donald | 260—67 |
| 3,000,861 | 9/1961 | Brown et al. | 260—67 |
| 3,227,689 | 1/1966 | Asselt et al. | 260—67 |

OTHER REFERENCES

Kosolapoff: Organophosphorus Compounds, John Wiley & Sons, Inc., New York, 1950, chapter 10 (pages 278 and 304 relied on).

WILLIAM H. SHORT, *Primary Examiner.*

L. P. QUAST, *Assistant Examiner.*